March 1, 1938.  H. AUSTIN  2,109,610
REVERSING GEAR FOR USE IN THE POWER TRANSMISSION
OF VEHICLES, SHIPS, AND THE LIKE
Filed Aug. 25, 1934    3 Sheets-Sheet 1

Inventor
Herbert Austin
By Pennie Davis Marvin & Edmonds
Attorneys

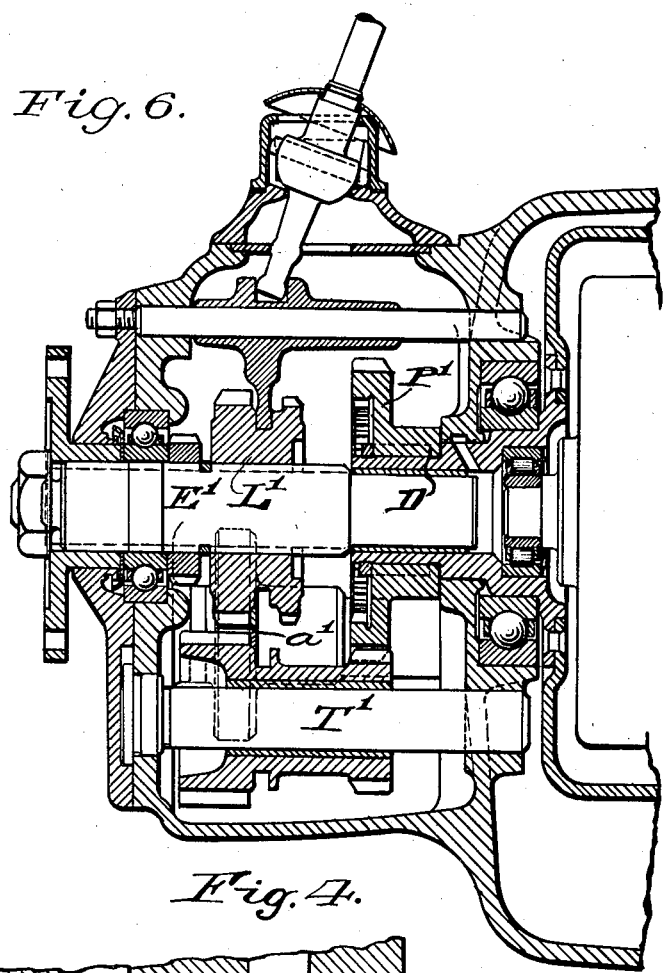
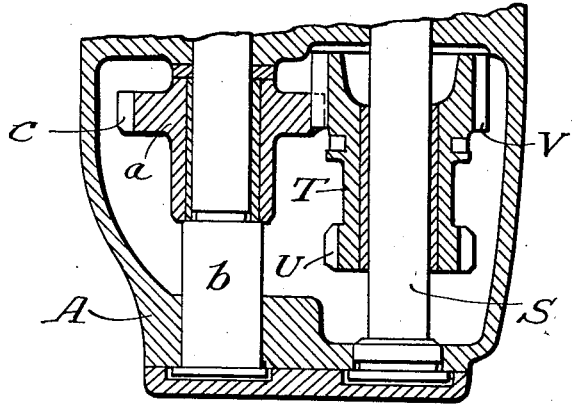

Patented Mar. 1, 1938

2,109,610

UNITED STATES PATENT OFFICE 2,109,610

REVERSING GEAR FOR USE IN THE POWER TRANSMISSION OF VEHICLES, SHIPS, AND THE LIKE

Herbert Austin, Bromsgrove, England

Application August 25, 1934, Serial No. 741,433
In Great Britain September 5, 1933

4 Claims. (Cl. 74—355)

There are certain types of change speed gear, such for instance as those of the epicyclic and friction types, in which it is not expedient to combine the reversing gear therewith; and there are cases of power transmission, such for instance as in the case of ships, in which there is no change speed gear. The present invention has for its object to provide an improved form of reversing gear as an integral unit which may be mounted in a separate casing or mounted in the same casing as the change speed gear, if such is employed, or in a separate compartment thereof.

A reversing gear constructed according to the invention comprises a driving shaft and a driven shaft coaxial with each other and a lay shaft and idle wheel, and the arrangement is such that, for direct drive, the lay shaft and idle wheel are drivingly disconnected from the other said parts but not necessarily from each other.

Convenient embodiments of the invention are described with reference to the drawings herewith, of which:—

Figure 4 is a sectional plan view, the section being taken in the plane indicated by the line 4, 4, of Figure 3.

Figure 1:
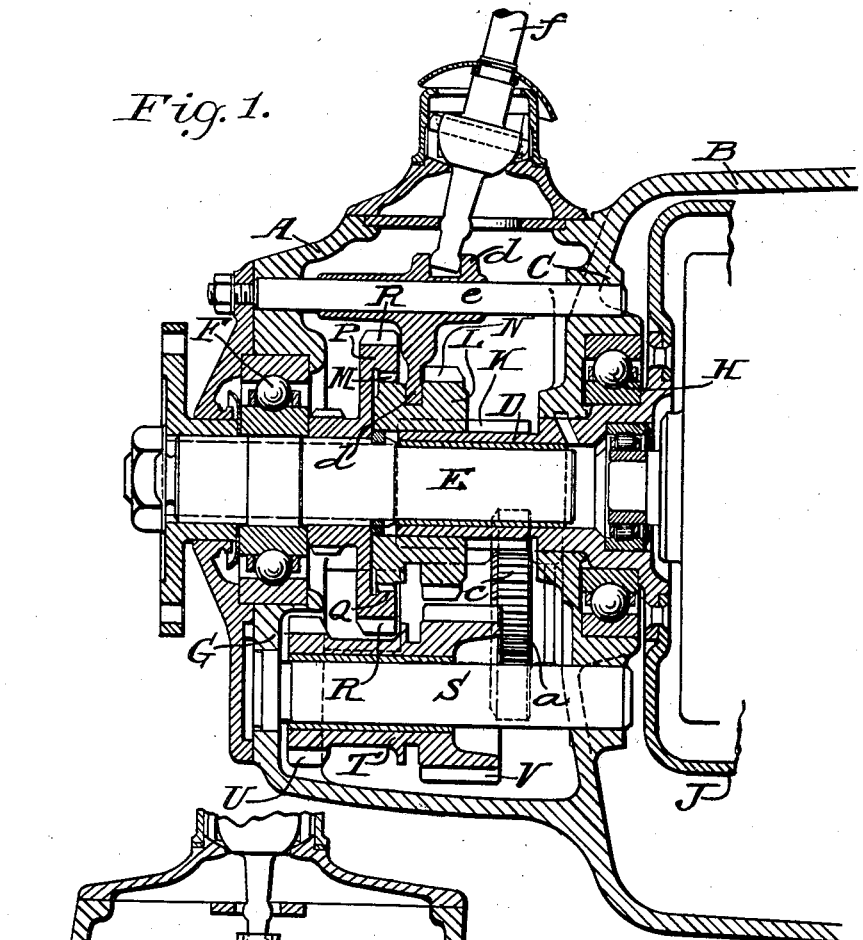
Figure 1 is a longitudinal section taken in the mid-vertical plane of a reversing gear constructed according to this invention, the casing of such gear being integral with and forming a compartment of the casing of a change speed gear of the friction type designed for use on a motor vehicle. In this view the reversing gear parts are shown in the positions they assume for forward running.
Figure 3:
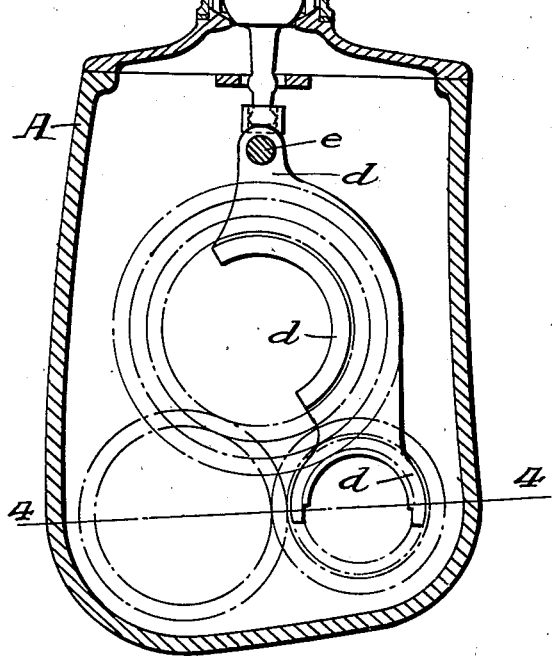
Figure 3 is a somewhat diagrammatic transverse sectional view to illustrate the operating fork in end elevation, and showing the pitch lines of the wheels by broken lines.
Figure 2:
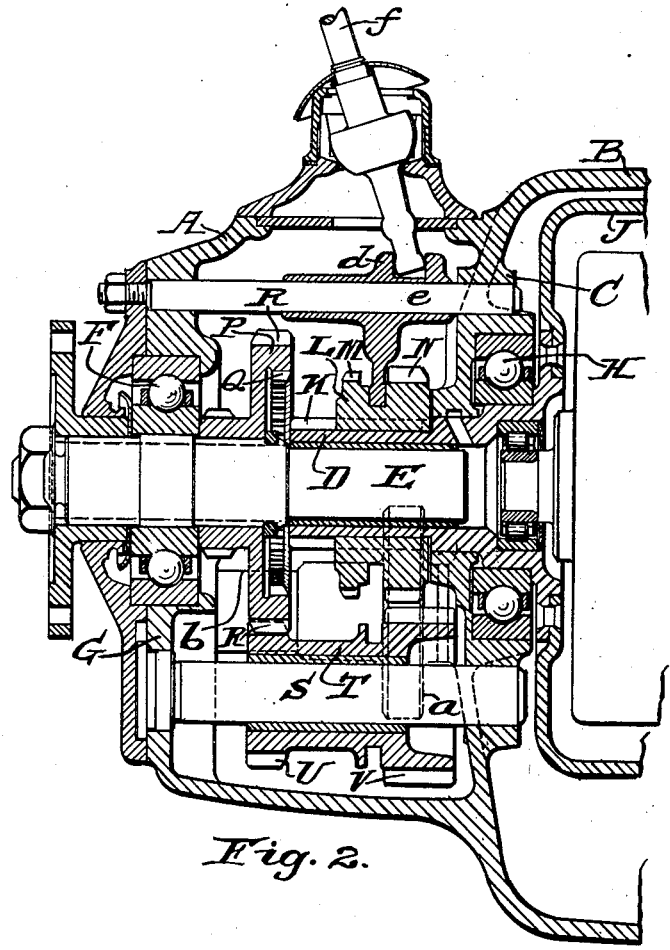
Figure 2 is a view corresponding to Figure 1, but showing the parts in the positions they assume for reverse.

Referring first to Figures 1 to 4, A is the casing of the reversing gear and it is formed integral with the casing B of change speed gear of the friction type, but this latter forms no part of the present invention. C is a partition wall between these two casings. The driving shaft of the reversing gear, indicated by D, is in the form of a sleeve turning freely on the end of the driven shaft E which runs in ball bearings F set in the rear wall G of the casing A. The driving shaft D runs in ball bearings H set in the wall C. The drive from the change speed gear is transmitted to the sleeve D through a rotating casing J.

The driving sleeve D has splines K on which is splined a clutch member L which is free to be moved endwise. The member L has, at its rear end, clutch teeth M; and, at its forward end, gear teeth N. On the driven shaft E is rigidly splined a gear wheel P having peripheral gear teeth R of the usual kind and internal clutch teeth Q adapted to engage with the clutch teeth M of the clutch member L when the latter is moved rearwardly.

S is an arbor fixed in the casing and on it rotates a sleeve T forming the lay shaft. This sleeve, at its rear end, carries a gear wheel U adapted, when the sleeve T is moved forward, to mesh with the teeth R of the wheel P. The sleeve T, at its forward end, carries a gear wheel V which is formed relatively wide for a purpose which will be presently described.

$a$ (see especially Figure 4) is an idle wheel turnably mounted on an arbor $b$ fixed in the casing, but the wheel $a$ is prevented from moving endwise. The wheel $a$ has gear teeth $c$ which are constantly in mesh with the wheel V of the sleeve T. The teeth $c$ also mesh with the teeth N of the clutch member L when the latter is moved forwardly. Even when the sleeve T is in its fully rearward position, its wheel V does not move wholly out of engagement with the teeth $c$ of the idle wheel $a$.

The clutch member L and the sleeve T are moved endwise together by a common fork $d$ sliding on a rod $e$ fixed to the casing. The fork is moved endwise by a hand-operated lever $f$.

When forward drive is desired, the lever $f$ is moved forward to its extreme position (see Figure 1) and this causes the fork $d$ to move the clutch member L and the sleeve T each to its most rearward position. In this condition, the wheel U of the sleeve T is out of engagement with the teeth R of the wheel P and the teeth N of the clutch member are out of engagement with the idle wheel $a$. Hence the sleeve T and the idle wheel $a$ do not rotate, but they remain in mesh with each other, there still being a small amount of overlap of the teeth (see Figure 1). The clutch teeth M, however, of the clutch member L have come into engagement with the internal clutch teeth Q of the wheel P. Hence the driving and driven shafts are coupled together.

To obtain a neutral condition, the lever f is brought to an intermediate position. This causes the fork d to move the clutch teeth M from the clutch teeth Q and no drive is transmitted either way until the lever f is moved further to the rear.

This further rearward movement of the lever f causes the clutch member L and the sleeve T to be moved further forward until the teeth N engage with the teeth c of the idle wheel a and these latter teeth are at all times in engagement with the wheel V of the sleeve T. As the latter also moves forward under the action of the fork d the wheel U is caused to engage with the teeth R of the wheel P. Thus reverse drive is obtained.

The main advantage of this form of reversing gear is that during forward running there are no revolving gear wheels intermeshing.

Figure 5:
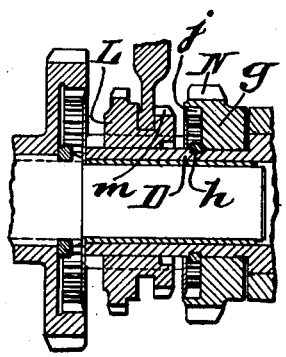
Figure 5 is a fragmentary view in longitudinal vertical section to illustrate an alternative arrangement; and, Figure 6 is a view corresponding in some degree to Figure 2 but showing a modification in which the sliding clutch member is mounted on the driven shaft, instead of on the driving shaft.

Referring next to Figure 5, the general arrangement is similar to that described above, but the teeth N are formed on a separate wheel g which runs loosely on the driving shaft D being kept from endwise movement thereon by a split ring h. The wheel g has internal clutch teeth j with which engage external clutch teeth m on the clutch member L. In this case the teeth N, during forward running, remain in mesh with the teeth c of the idle wheel; but the wheel g does not at such time rotate, the shaft D turning freely within it.

Referring to Figure 6, the general working of the parts is similar to that described by reference to Figures 1 to 4, but the clutch member L' is splined on the driven shaft E' instead of on the driving shaft D, and the wheel P' (corresponding to the wheel P) is rigidly splined on the driving sleeve D. In this case, the clutch member L' and lay shaft sleeve T' are moved to the rear for reverse (as shown in Figure 6) and forwardly for forward drive.

It will be seen that, in this modification, the sleeve T' and the idle wheel a' do not rotate during forward running; but, as before, they remain in mesh with each other.

Having fully described my invention what I claim and desire to secure by Letters Patent is:—

1. A reversing gear formed as a separate unit and comprising two shafts in axial alignment, the one a driving and the other a driven shaft, an endwise movable lay shaft mounted to turn about an axis parallel to said aligned shafts, a toothed wheel on one of said aligned shafts, a first toothed wheel on said lay shaft, a toothed idle wheel so mounted as to turn about an axis which is parallel to the axis of said shafts, a second toothed wheel on said lay shaft with which the teeth of said idle wheel engage, clutch teeth rigid with respect to one of said aligned shafts, a clutch member slidable endwise on, but prevented from turning in relation to, the other of said aligned shafts, clutch teeth on said member, means for rotatably engaging the clutch member to the idle wheel, and a common operative member engaging with said slidable clutch member and with said lay shaft and movable in one direction to effect coupling between said slidable clutch member and said idle wheel and between said wheel on said first mentioned aligned shaft and said first wheel on said lay shaft for reverse, and movable in the opposite direction to uncouple and disengage such parts and to engage said clutch teeth of said slidable clutch member with said clutch teeth of said first mentioned aligned shaft for forward drive.

2. A reversing gear formed as a separate unit and comprising two shafts in axial alignment, the one a driving and the other a driven shaft, an endwise movable lay shaft mounted to turn about an axis parallel to said aligned shafts, a toothed wheel on said driven shaft, a first toothed wheel on said lay shaft, a toothed idle wheel mounted to turn about an axis which is parallel to the axis of said shafts, a second toothed wheel on said lay shaft with which the teeth of said idle wheel engage, clutch teeth rigid with respect to said driven shaft, a clutch member slidable endwise on, but prevented from turning in relation to the said driving shaft, clutch teeth on said member, means for rotatably engaging the clutch member to the idle wheel, and a common operative member engaging with said slidable clutch member and with said lay shaft and movable in one direction to effect coupling between said slidable clutch member and said idle wheel and between said wheel on said driven shaft and said first wheel on said lay shaft for reverse, and movable in the opposite direction to uncouple and disengage such parts and to engage said clutch teeth of said slidable clutch member with said clutch teeth of said driven shaft for forward drive.

3. A reversing gear formed as a separate unit and comprising two shafts in axial alignment, the one a driving and the other a driven shaft, an endwise movable lay shaft mounted to turn about an axis parallel to said aligned shafts, a toothed wheel on one of said aligned shafts, a first toothed wheel on said lay shaft, a toothed idle wheel mounted to turn about an axis which is parallel to the axis of said shafts, a second toothed wheel on said lay shaft with which the teeth of said idle wheel engage, clutch teeth rigid with respect to one of said aligned shafts, a clutch member slidable endwise on, but prevented from turning in relation to, the other of said aligned shafts, clutch teeth on both ends of said clutch member, a toothed wheel freely mounted on said other of said aligned shafts and being a second toothed idle wheel and being constantly in engagement with said idle wheel on said parallel shaft, clutch teeth on said freely mounted wheel and a common operative member engaging with said slidable clutch member and with said lay shaft and movable in one direction to cause said clutch teeth at one end of said sliding clutch member to engage with said clutch teeth on said second toothed idle wheel and to engage said wheel on said first mentioned aligned shaft with said first wheel on said lay shaft for reverse and moved in the opposite direction to disengage such parts and to engage the other clutch teeth of said slidable clutch member with said clutch teeth of said first mentioned aligned shaft for forward drive.

4. A reversing gear formed as a separate unit and comprising two shafts in axial alignment, the one a driving and the other a driven shaft, an endwise movable lay shaft mounted to turn about an axis parallel to said aligned shafts, a toothed wheel on one of said aligned shafts, a first toothed wheel on said lay shaft, a toothed idle wheel mounted to turn about an axis which is parallel to the axis of said shafts, a second toothed wheel on said lay shaft with which the teeth of said idle wheel engage, clutch teeth rigid with respect to one of said aligned shafts, a clutch member slidable endwise on, but prevented from turning in relation to, the other of said aligned shafts, clutch teeth on said clutch member, and gear teeth on said clutch member adapted to be brought into mesh with the teeth of said idle wheel and a common operative member engaging with said slidable clutch member and with said lay shaft and movable in one direction to cause said gear teeth on said slidable clutch member to engage with the teeth of said idle wheel and to cause said wheel on said first mentioned aligned shaft to engage with said first wheel on said lay shaft for reverse, and movable in the opposite direction to disengage such parts and to engage said clutch teeth of said slidable clutch member with said clutch teeth of said first mentioned aligned shaft for forward drive.

HERBERT AUSTIN.